April 4, 1967 MEGUMI FUJINAKA 3,312,785

NUMBER TRANSLATOR

Filed Dec. 3, 1962

United States Patent Office 3,312,785
Patented Apr. 4, 1967

3,312,785

NUMBER TRANSLATOR

Megumi Fujinaka, Kodaira-shi, Tokyo-to, Japan, assignor to Kabushiki Kaisha Hitachi Seisakusho, Tokyo-to, Japan, a joint-stock company of Japan Filed Dec. 3, 1962, Ser. No. 241,741
Claims priority, application Japan, Dec. 5, 1961, 36/43,472
2 Claims. (Cl. 179—18)

Figure 1:
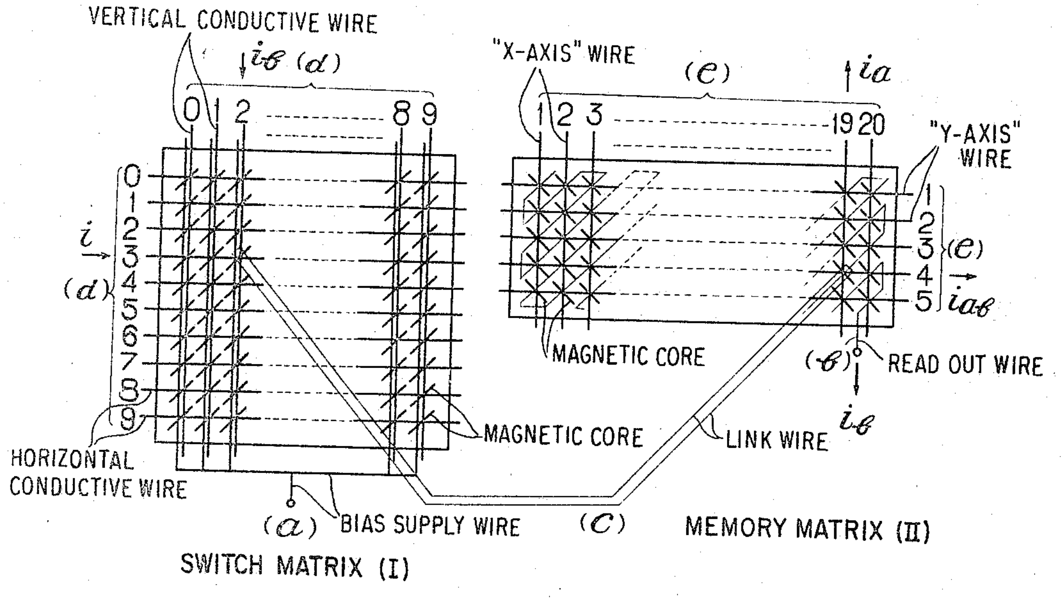

This invention relates to translators, and more particularly it relates to a device capable of mutual translation between two number groups (A*i* and B*i*) which do not have a systematic relationship such as, for example, the relationship in automatic telephone exchange practice between a number group due to dial signals and the selected equipment number group within an exchange, and which have a one-to-one correspondence, or of translating any one number of one number group (for example: A*i*) to the corresponding number of the other number group (B*i*).

The term "number" as used herein may be considered to be a numerical value which can be represented by an integer, or, in general, the aforesaid device may be considered to be a means which accomplishes the operation of looking up a numerical table, the corresponding value of the said table.

However, it is necessary that the above-mentioned number translator possess such a function that, in the general case wherein a certain specific number of the second number group (B*i*) is already occupied for some reason, the fact that the said number of the group (B*i*) corresponding to a previously designated number of the first number group (A*i*) is occupied is indicated. The terms "occupied" and "occupancy," etc., are to denote that the number is engaged or, as commonly used, is "busy" or receives a "busy signal."

Furthermore, in the case wherein a pair of corresponding numbers of the first and second number groups is to be used for a certain operation, when a number which is exactly the same as the number of this pair belonging to the first number group (A*i*) is designated in this translator, it is necessary to indicate in the afore-said manner that it is occupied. Additionally, it is necessary to reset (cancel) the information of busy state immediately upon completion of the operation by the said pair of numbers.

In order to fulfill the above-stated requirements, the translator of the present invention is so adapted that, when one number of the first number group (A*i*) is designated, and one number in the second number group (B*i*) corresponding thereto is not occupied, translation action is carried out, and the latter number emerges as the output; and, at the same time, the said latter number is switched to the occupied or busy state. Moreover, it is possible to place the number of the second number group in the occupied or busy state irrespective of the corresponding first number group (A*i*), and this translator furthermore is capable of resetting the said state.

The above-described functions of the number translator of this invention may be simply summarized in the following manner.

In a first number group (A*i*) and a second number group (B*i*) (where $i=1, 2, \ldots N$), A*i* and B*i* correspond to each other, and the translator has the following two functions.

(1) When A*i* is introduced as an input:
- A busy signal emerges when B*i* is previously occupied; and
- B*i* emerges and, simultaneously, B*i* becomes busy when B*i* is not previously occupied, and (2) When B*i* is introduced as an input independently of A*i*:
- B*i* becomes occupied or is reset.

One example of application of the present invention which may be mentioned is a device which accomplishes translation from the number group introduced by a dial signal in an automatic telephone exchange system to the equipment number group which selects and discriminates the equipment within the exchange to be used. That is, if the dial number group is denoted by A*i*, and the equipment number group by B*i*, according to the afore-stated explanation, when equipment number B*i* is not in a busy state (including the state in the call origination), the translator produces B*i* as its output and enables connecting action when a dial number A*i* is received from another subscriber.

On the other hand, when the equipment number B*i* is already in the busy state, and the dial number A*i* is received from the other subscriber, the translator sends out only a busy signal and immediately informs the said other subscriber that connection is not possible. Then, when the above-stated busy state ends, a reset signal (signal for cancelling occupancy) is caused to be sent from the equipment having the number B*i* to the translator by the "on hook" operation (replacement of the handset on its cradle) by the equipment number B*i*. When the subscriber of the equipment number B*i* performs the "off hook" operation to begin the process of calling another subscriber, an occupancy signal is introduced into the translator from the equipment having the number B*i*.

As described above, the number translator according to this invention is capable of accomplishing number translation and, simultaneously, storing information on the states of occupancy and non-occupancy.

The nature, principle, and details of the invention will be more clearly apparent by reference to the following description in specific terms of one representative embodiment of the invention when taken in conjunction with the accompanying drawing in which:

FIG. 1 is a schematic line diagram showing the embodiment; and

Figure 2:
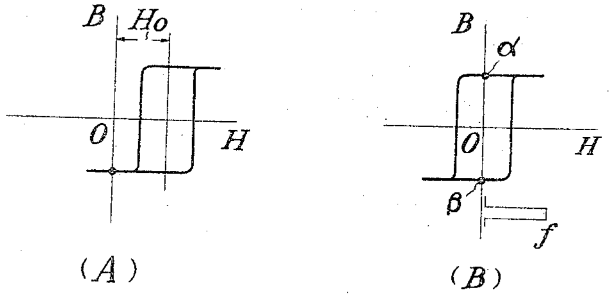

FIG. 2 consists of two graphical representations, each showing the hysteresis loop of a core of the apparatus of FIG. 1.

FIG. 1 illustrates two core matrices used as memory in an ordinary electronic computer. Of these matrices, the first matrix (I), for example, having a number of cores which is 10 x 10, is capable of representing the first number group A*i* by column numbers from 0 to 9 and row numbers from 0 to 9 and is here referred to as a switch-matrix. The second matrix (II), for example, having a number of cores which is 20 x 5, is capable for representing the second number group B*i* by column numbers from 1 to 20 and row numbers from 1 to 5 and is here referred to as a memory-matrix.

Each of the first and second matrices has vertical and horizontal conductive wires, whereby any core, that is, any number, can be selected. In addition to these wires, the switch-matrix (I) has a conductor wire *a* for providing a biasing magnetic field, and the memory-matrix (II) has a read-out wire *b* which goes through the whole core and is arranged diagonally.

As one example of representative arrangement, the horizontal wires of the switch-matrix (I) are adapted to represent the second decimal digits of the two-digit decimal numbers of the first number group A*i*, and the vertical wires are adapted to represent the first decimal digits. Furthermore, the horizontal wires of the memory-matrix (II) are adapted to represent the row numbers from 1 to 5 of the second number group B*i*, and the vertical wires are adapted to represent the column numbers from 1 to 20.

In addition, in accordance with the correspondence preestablished between these first and second number groups, link wires *c* are provided to establish correspondence in a one-to-one manner between the respective cores of the matrices in positions consonant with the aforesaid preestablished correspondence. Although only one pair of the representative link wires *c* is shown in FIG. 1, a total of 100 such link wires exist in the case of the present embodiment. Actually in this case, of course, it is necessary to devise these link wires specially so as to establish the aforesaid correspondence between the matrices in a positive and accurate manner. For example, it is necessary to take such measures as winding each link wire with three turns at the core on the switch-matrix side and with one turn at the core on the memory-matrix side, or inserting a diode between the two matrices.

Cores for switching are used for the cores of the switch-matrix (I), and each core is so adapted as to exhibit magnetic characteristics as indicated in FIG. 2(A) when a suitable D.C. current is caused to flow constantly through the afore-mentioned wire *a* for the biasing magnetic field, and the flux therein is automatically reset when an input signal vanishes. Cores for memory are used for the cores of the memory-matrix (II), and the magnetic characteristics of each core are as indicated in FIG. 2(B). The state ($\alpha$) of positive residual flux of the said core is predetermined as the occupancy state, and its negative residual flux state ($\beta$) is predetermined as the non-occupancy state.

As an example, it will be assumed that a two-digit decimal number "32" as indicated in FIG. 1 is introduced as one number of the first number group A*i*. Then, through a suitable selection circuit, current pulses *i* and $i_b$ are impressed on the horizontal wire 3 and the vertical wire 2 respectively of the switch-matrix (I), that is, the input terminals *d*, and only the core of the intersection of the said wires undergoes flux reversal. A current pulse then flows through one of the link wires *c*, whereby a pulse field *f* as indicated in FIG. 2(B) is impressed on the core of the intersection of, for example, the 19th column and the 4th row, of the memory-matrix (II). Then, when the said core, for example, is in the non-occupancy state $\beta$ as indicated in FIG. 2(B), the said core undergoes flux reversal and assumes the occupancy state $\alpha$. Simultaneously, current pulses $i_a$ and $i_{ab}$ flow through the wires of the column 19 and the row 4 respectively of the memory-matrix (II), and a translated number 19th column, 4th row is obtained from the output terminals *e*.

At this time, a current pulse $i_b$ is induced also in the wire *b* arranged diagonally, whereby the fact that the aforesaid core has been in the busy state until this time becomes apparent.

On the other hand, when the aforesaid core is in the occupied state $\alpha$, no response whatsoever is obtained at the output terminals *e* of the memory-matrix, but since a signal indicating "no output" is obtained from the aforesaid link wire *b*, it is possible to detect the present busy state.

The writing in of occupancy information and occupancy reset (non-occupancy) information into the memory-matrix (II), independently of the switch-matrix (I) can be accomplished by a process similar to that of writing in of an ordinary matrix memory in electronic computers.

Although the foregoing disclosure has described the case wherein two number groups (A*i* and B*i*) have a one-to-one correspondence, it is possible to establish correspondence also for a number which is in the first number group (A*i*) but not in the second number group (B*i*). In this case, since the said number is unobtainable, it may be provided with a function of informing of this fact. For this purpose, for example, only the link wires *c* of unobtainable numbers may be collected and led to suitable signaling equipment.

Although the foregoing description has related to the ferrite core matrix used in the memory devices of such apparatuses as computers, it will be apparent that this description is equally applicable to the case wherein bistable elements of any type, in general, are combined in matrix form.

Since in the number translator of this invention, core matrices are used, the speed of translation of this translator is high. Moreover, since there are no mechanical parts, the translator has a long life. Furthermore, this translator is highly advantageous in the miniaturization of devices, which is a problem at present, and in the economy, and extremely suitable for use, especially, in automatic telephone exchange systems.

Although this invention has been described with respect to a particular embodiment thereof, it is not to be so limited as changes and modifications can be made therein which are within the full intended scope of the invention, as defined by the appended claims.

What is claimed is:

1. A number translator for translating a predetermined number in a first number group into a number in a second number group which comprises switch matrix means composed of switching elements disposed in the form of matrices in correspondence to respective numbers of the first number group to be translated, memory matrix means composed of memory elements disposed in the form of matrices so as to assume required monostable and bistable states in correspondence to respective numbers of the second number group to be taken out as a conversion output, and link wires to connect corresponding switching elements and memory elements, whereby, by selectively controlling the switching element corresponding to any optional number in said first number group, a translating operation is carried out so as to put a number in said second number group corresponding to said number in said first number group into busy state and, at the same time, to detect the respective monostable and bistable states of said memory element.

2. A number translator for translating a predetermined number, in a first number group, introduced by a dial signal in an automatic telephone exchange system, into a second number group which selects and discriminates the equipment within the exchange to be used, comprising: switch matrix means composed of switching elements disposed in the form of matrices in correspondence to respective numbers of the first number group to be translated; memory matrix means composed of memory elements disposed in the form of matrices so as to assume required monostable and bistable states in correspondence to respective numbers of the second number group to be taken out as a conversion output; and read-out wires to connect corresponding switching elements and memory elements, whereby, by selectively controlling the switching elements corresponding to any optional number in said first number group, a translation operation is carried out to put a number in said second number group corresponding to said number in said first number group into busy state and, at the same time, to detect the respective monostable and bistable states of said elements.

References Cited by the Examiner

UNITED STATES PATENTS

| | | | |
|---|---|---|---|
| 2,843,838 | 7/1958 | Abbott | 179—18 |
| 2,912,511 | 11/1959 | McKim | 179—18 |
| 3,046,351 | 7/1962 | Bennett et al. | 179—18 |
| 3,201,519 | 8/1965 | Schmitz | 179—18 |

KATHLEEN H. CLAFFY, *Primary Examiner.*

WILLIAM C. COOPER, *Examiner.*